J. T. PAGE.
Gridiron.
No. 62,437.
Patented Feb. 26, 1867.
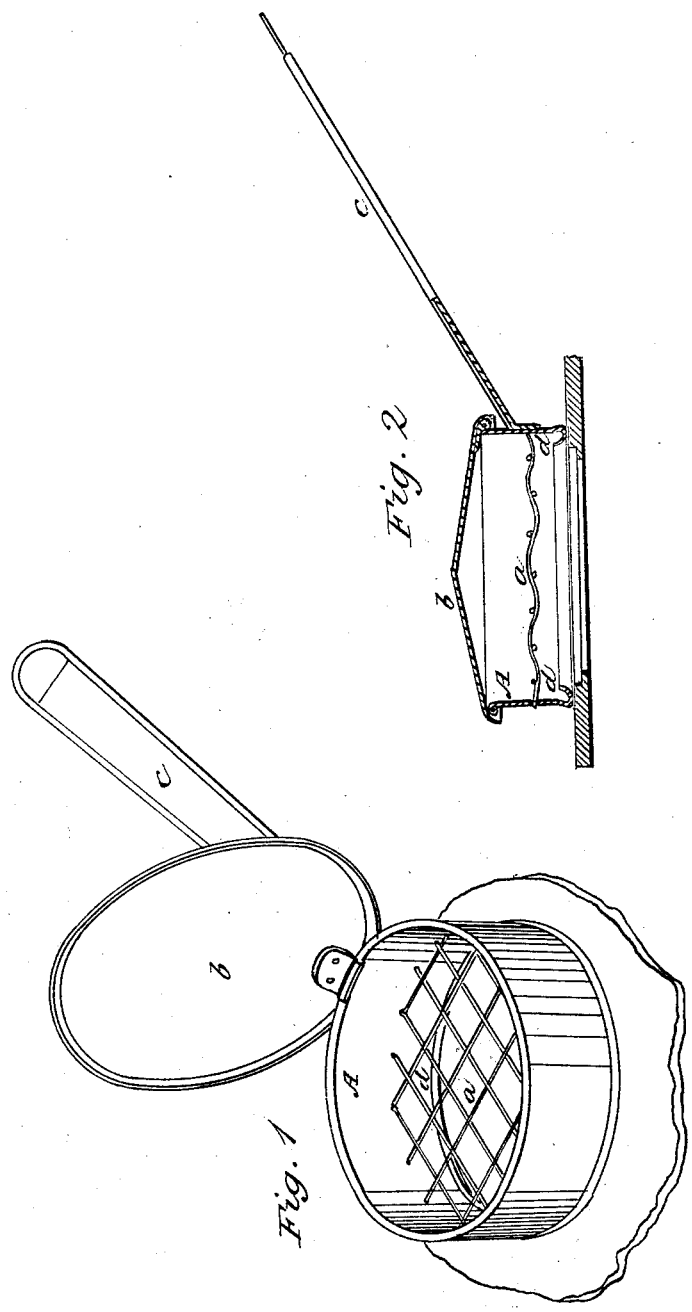
Witnesses:
J. A. Davis
A. D. Davis
Inventor:
J. T. Page.
By J. Fraser & Co
Attys

United States Patent Office.

JAMES T. PAGE, OF ROCHESTER, NEW YORK.

Letters Patent No. 62,437, dated February 26, 1867.

IMPROVEMENT IN GRIDIRONS.

The Schedule referred to in these Letters Patent and making part of the same.

TO ALL WHOM IT MAY CONCERN:

Be it known that I, JAMES T. PAGE, of Rochester, in the county of Monroe, and State of New York, have invented a new and useful Improvement in Bread Toasters and Meat Broilers; and I do hereby declare that the following is a full and exact description thereof, reference being had to the accompanying drawings, making part of this specification.

Figure 1 is a perspective view of my improved device with the cover raised.

Figure 2, a vertical section with the cover closed, and the device resting over the pot hole of a stove.

Like letters of reference indicate corresponding parts in both figures.

My invention consists, as a new article of manufacture, in the combination and arrangement of a groove or channel with a closed receptacle for placing over the pot hole of a stove, so that while the smoke is prevented from passing into the room, the heat is also confined within the receptacle, thereby facilitating the cooking of the food placed therein, and the said groove or channel will catch such grease as runs down the sides of the receptacle, and prevent the same from besmearing the stove.

As represented in the drawings, A is the receptacle, which is simply a rim made of sheet metal, and having within a bed, $a$, of wire mesh, on which the material to be cooked is placed. The rim is provided with a cover, $b$, which shuts down closely over it, and also with a handle, $c$, by which it is operated. At the bottom, the rim is turned inward and upward to a suitable extent, so as to form a groove or channel, $d$, all around the lower inner periphery, as clearly shown. The great advantage of this arrangement is that while the receptacle is made closed, so that when placed over the fire none of the offensive smoke can escape into the room, at the same time, by confining the heat within the receptacle, the food is much more rapidly and uniformly cooked, and the groove or channel $d$ will catch such drippings as run down the sides of the receptacle and would otherwise besmear the top of the stove. This is a matter of much importance, for it renders the use of the device unattended with difficulty from this source. The top of the stove will remain clean at all times. The closing of the receptacle will cause the offensive smoke to be drawn off by the draught of the stove.

The construction of this device is very simple and cheap, being made up only of the rim and cover. In this respect it is far superior to those broilers in which the substance to be broiled is wrapped around a wheel that is made to turn, and which requires to be boxed up in an expensive manner.

What I claim as my invention, and desire to secure by Letters Patent, as a new article of manufacture, is—

An open-bottomed sheet-metal utensil having its lower edge turned up to form the annular groove or channel $d$, provided with the wire grating $a$, and cover $b$, combined and arranged substantially as and for the purposes set forth.

In witness whereof I have hereunto signed my name in the presence of two subscribing witnesses.

J. T. PAGE.

Witnesses:
 R. F. OSGOOD,
 J. A. DAVIS.